United States Patent [19]

Espenschied et al.

[11] 4,267,750
[45] May 19, 1981

[54] METHOD AND APPARATUS FOR ADJUSTING THE OPERATING FORCE APPLIED TO GEARS DURING GEAR SHIFTS

[75] Inventors: Helmut Espenschied; Uwe Kiencke, both of Ludwigsburg; Alfred Schulz, Oberriexingen, all of Fed. Rep. of Germany

[73] Assignee: Robert Bosch GmbH, Stuttgart, Fed. Rep. of Germany

[21] Appl. No.: 932,172

[22] Filed: Aug. 9, 1978

[30] Foreign Application Priority Data

Sep. 19, 1977 [DE] Fed. Rep. of Germany ....... 2742032

[51] Int. Cl.³ .................... B60K 41/10; F16H 3/74
[52] U.S. Cl. .................... 74/866; 74/752 A; 74/752 D; 74/861
[58] Field of Search ............. 74/866, 861, 878, 752 D, 74/752 A, 753, 733

[56] References Cited

U.S. PATENT DOCUMENTS

| | | | |
|---|---|---|---|
| 3,604,288 | 9/1971 | Mori | 74/866 X |
| 3,662,625 | 5/1972 | Wakamatsu et al. | 74/866 |
| 3,690,197 | 9/1972 | Sumiyoshi et al. | 74/752 A |
| 3,710,630 | 1/1973 | Sumiyoshi et al. | 74/752 A |
| 3,752,011 | 8/1973 | Casey et al. | 74/866 X |
| 3,882,740 | 5/1975 | Forster et al. | 74/866 |
| 3,886,818 | 6/1975 | Wurst | 74/866 |

FOREIGN PATENT DOCUMENTS 1530825 7/1969 Fed. Rep. of Germany ........ 74/866

*Primary Examiner*—Leslie Braun
*Attorney, Agent, or Firm*—Frishauf, Holtz, Goodman & Woodward

[57] ABSTRACT

The main pressure in the gearing which under normal operating conditions is 150% of the amount required to transmit the then-present torque is reduced to 100% when an upshift takes place under load or a downshift takes place under no load. For a downshift under load and an upshift under no load the pressure is reduced to about 30%. The position of the control rod of an injection pump at the beginning of a shift operation is stored until the shift is completed. This allows the present system to cooperate with a system wherein the control of the injection pump is shifted from the gas pedal to a regulator during gear shifts.

15 Claims, 4 Drawing Figures

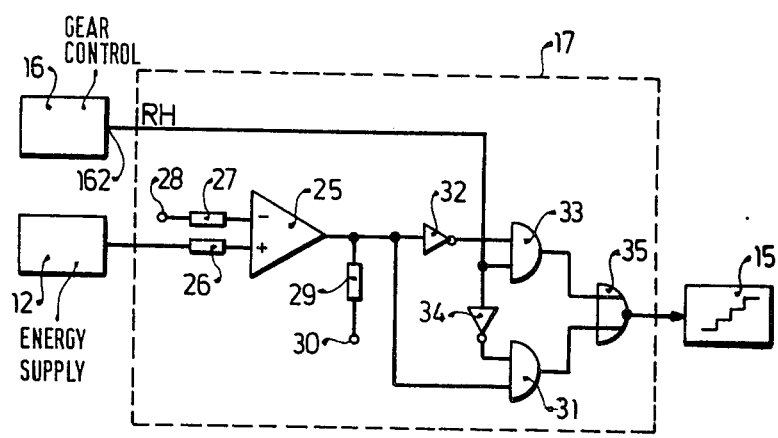
FIG. 3
FIG. 4
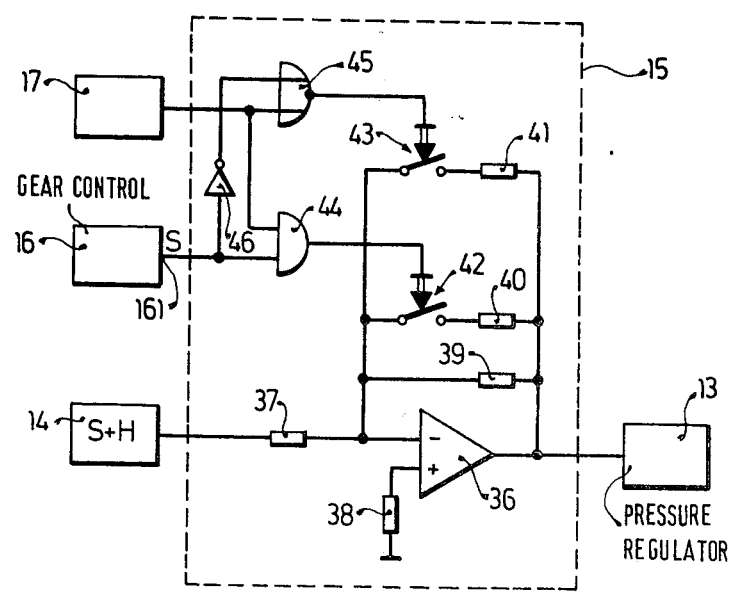

METHOD AND APPARATUS FOR ADJUSTING THE OPERATING FORCE APPLIED TO GEARS DURING GEAR SHIFTS

Cross reference to related application, assigned to the assignee of this application: U.S. Ser. No. 932,171, filed Aug. 9, 1978 (ESPENSCHIED et al).

The present invention relates to methods and apparatus for controlling the operating force required during gear shift operations. In particular, it relates to such method and apparatus when used in drives for motor vehicles.

BACKGROUND AND PRIOR ART

In motor vehicles and, particularly, in trucks, gear shifts are carried out hydraulically. For this purpose the pressure in the hydraulic gearing is changed during the shift process. This allows gear shifts from one gear to the next to be carried out smoothly thereby increasing the comfort of the driver and passengers and reduces the wear of different parts of the gearing as for example the couplings and the brake bands in planetary gearing. System are known in which it is attempted to achieve a smooth shift by controlling the flow of the hydraulic medium through oil atomizers and by controlling the pressure of the medium during the shift process. Apparatus for controlling the main pressure in automatic gear control systems is disclosed in U.S. Pat. No. 3,886,818 in which the position of the throttle valve of the engine is sensed and converted to an electrical signal which in turn is changed into a mechanical quantity which controls the main pressure. The relationship between the main pressure and the throttle valve position is specified by the proper choice of the characteristic curve connecting the two quantities. It is a disadvantage of this apparatus that the different relationships for upshift and downshift in load and no load conditions are not sufficiently taken into consideration since the main pressure is always decreased when the gas pedal is released, thereby making it more difficult to achieve synchronized operation of the parts which are to be brought in engagement.

THE INVENTION

It is an object of the present invention to improve gear shifting by taking into account the different conditions for upshift and downshift under load and no load conditions. In accordance with the invention, the operating force is adjusted by predetermined factors taking into consideration the various combinations of the above-mentioned operating conditions. Specifically, the main pressure is decreased to the amount required to transmit the then-present torque during upshifts under load and downshifts under no load conditions. This causes a braking of the engine and rapid obtainment of synchronism between the parts to be brought into engagement. On the other hand, during downshift under load and upshift under no load conditions the main pressure is not decreased to zero as is the case in the known systems. A small load therefore remains on the engine causing possible torsional oscillations to be damped or totally suppressed.

In a preferred embodiment, a digital circuit furnishes a signal indicative of whether upshift under load or downshift under no load is present or whether then-present operating conditions correspond to downshift under load or upshift under no load. Under normal operating conditions the main pressure is adjusted to a value which is increased by predetermined factor relative to the pressure required to transmit the then-present torque. This pressure is decreased during shift operations, the amount of decrease being different for the two sets of conditions specified above. Main pressure in the gearing is thus adjusted in three different steps. This has the advantage that the torque is transmitted reliably under normal operating conditions while a smooth and reliable gear shift can also be carried out.

The main pressure normally depends on the position of a control member of an energy supply which meters the energy to the engine. For example such a control member can be the control rod of an injection pump. In order to prevent erroneous operation of the gas pedal from introducing unwanted changes in the control of the shift operation and to make the present system compatible with gear control arrangements in which the control of the energy supply is switched from the gas pedal to a regulator during the gear shift, the position of the gas pedal at the start of the shift operation is stored until the shift operation is completed.

In a particularly preferred embodiment a gear control stage which has a first terminal furnishing a "1" signal to initiate a gear shift and a second terminal which furnishes a "1" signal for upshift operations and a "0" signal for downshift operations is incorporated into the system of the present invention. This allows the digital circuit which differentiates between the two sets of operating conditions as described above to be a particularly simple circuit.

DRAWINGS ILLUSTRATING A PREFERRED EMBODIMENT

FIG. 3 is a circuit diagram of the load/shift direction unit of FIG. 1;

Figure 1:
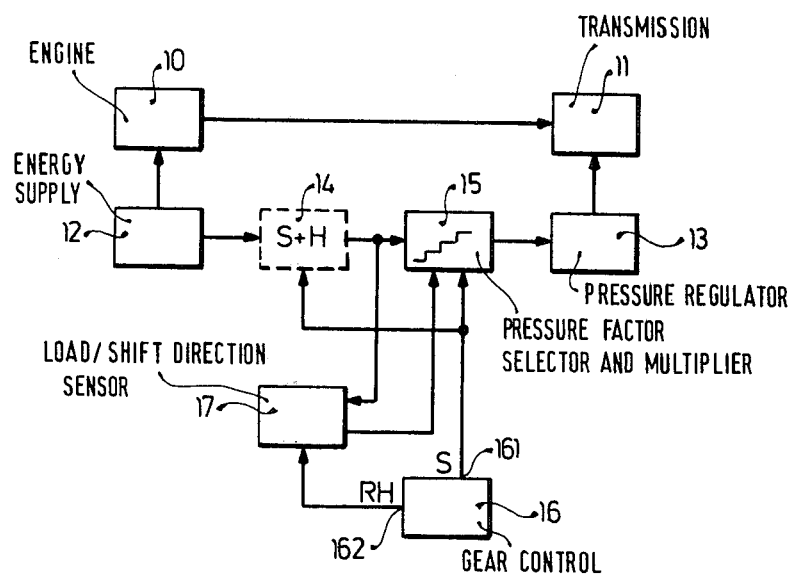
FIG. 1 is a block diagram of the apparatus of the present invention as interconnected with the engine and gearing.

and FIG. 4 is a circuit diagram of the pressure factor computing unit of FIG. 1.

In FIG. 1, an engine 10 cooperates with gearing 11 which can be arranged to furnish a plurality of predetermined gear ratios. Connected to engine 10 is an energy supply 12 which meters the energy applied to the engine. A pressure regulator 13 is connected to gearing 11. Energy supply 12 is connected to a sample-and-hold unit 14, which in turn is connected to the pressure factor computing unit 15. The output of pressure factor computing unit 15 is applied to pressure regulator 13. Pressure factor computing unit 15 is connected to the shift command output 161 of a gear control unit 16 and to the output of load/shift direction unit 17. Gear control unit 16 has an upshift/downshift output on 162 which is connected to load/shift direction unit 17, while its shift command output 161 is connected to an input of sample-and-hold unit 14. The output of sample-and-hold unit 15 is also connected to an input of load/shift direction unit 17.

Engine 10 and gearing 11 together constitute a driving unit, for example the drive in a motor vehicle. The operation of engine 10, for example an internal combustion engine, is determined by the metered energy supplied by energy supply 12 in the preferred embodiment shown herein. The invention is however not to be limited to drives with internal combustion engines since it is applicable to many other types of drive motors 10 such as, for example, electro motors, gas turbines and such, each with its associated energy metering supply. Gearing 11 is activated by an auxiliary force supplied by a hydraulic system. The main pressure for gearing 11 which corresponds to the force required to activate the gearing from one gear ratio into another gear ratio is set by pressure regulator 13. Pressure regulator 13 in turn is controlled by the energy supply 12 at least via pressure factor computing unit 15. Pressure factor computing unit 15 weights the output signal of supply 12 such that a signal is supplied to pressure regulator 13 which causes a pressure to be applied to gearing 11 which exceeds or is less than the pressure required to transmit the then-present torque by a predetermined factor. In a preferred embodiment under normal operating conditions pressure factor computing unit 15 furnishes a signal signifying a factor of 1.5 so that the main pressure in the gearing is such that it corresponds to 150% of the pressure required to transmit the then-present torque. This assures a reliable transmission of the torque corresponding to the energy supplied by energy supply 12 and small spikes in the torque do not cause slippage and thus wear of the gearing and a decrease in driving comfort. Corresponding, as will be shown below, it is possible to set a factor of 1.0 for upshifts under load and downshifts while the engine is coasting and a factor of 0.3 for downshifts under load and upshifts while the vehicle is coasting. The signals for controlling unit 15 are derived from gear control unit 16 and from unit 17. Gear control unit 16 furnishes a "1" signal at output 161 if a shift operation is to take place. If no shift operation is to take place, the signal at output 161 of unit 16 is a "0" signal. In order to be able to differentiate between upshift and downshift processes in load and no load conditions, stage 17 is connected first of all to the output of energy supply 12. If the output signal of energy supply 12 is less than a predetermined threshold value, the engine is under no load and the vehicle is coasting. If the output signal of energy supply 12 exceeds the predetermined threshold value, the engine is operating under load. The signal at terminal 162 of gear control unit 16 is a logic "1" signal when an upshift operation is to take place and a "0" signal when a downshift operation is to take place. Since the pressure regulation in the gearing is the same whether an upshift under load or a downshift under no load takes place on the one hand or a downshift under load and an upshift while coasting takes place on the other hand, it is sufficient to determine whether the first or the second set of conditions applies. Therefore the upshift/downshift signal at terminal 162 of gear control unit 16 is transmitted to pressure factor computing unit 15 if the engines operating under load and is inverted before application to pressure factor computing unit 15 if no load conditions prevail.

In order to achieve synchronism between engine 10 and gearing 11, engine 10 must be braked for upshift operations and accelerated for downshifts. For this purpose the load of engine 10 is increased or decreased by setting the output of unit 15 to a higher or lower value respectively. The higher value for upshifts may for example be a factor of 1.0 relative to the value required for transmitting the then-present torque. For downshift it is at present the custom to let the engine run at no load. This however has the disadvantage that torsional vibrations may be set up. To avoid this or at least to dampen such oscillations sufficiently, a factor which is very low but finite is set by pressure factor computing unit 15 for downshifts. The factor in a preferred embodiment is 0.3. The following four operating conditions prevail:

a. Upshift under load: engine 10 is to be braked; a high pressure factor (1.0) loads the engine and decreases its speed.

b. Downshift under load: engine 10 is to be accelerated; a low pressure factor (0.3) causes the engine speed to increase, since only a low load is applied to the engine.

c. Upshift when coasting: engine 10 is to be braked; when coasting a low pressure factor (0.3) causes the engine speed to decrease, since the engine is being driven by the gearing.

d. Downshift when coasting: engine 10 is to be accelerated; a high pressure factor (1.0) increases engine speed when the engine is coasting, due to the change in the direction of torque transmission from gearing to motor.

The apparatus of the present invention thus allows a three step pressure control which accommodates all possible shift conditions. The gears are protected during engagement, their wear is decreased and the driving comfort is substantially increased since the shift process takes place in a much smoother fashion than with known apparatus.

In a further, particularly preferred embodiment of the invention, a sample-and-hold unit 14 is connected between unit 12 and unit 15. The hold input of sample-and-hold unit 14 is connected to the shift command output 161 of unit 16. It is the purpose of sample-and-hold unit 14 to hold the value at the output of energy supply 12 which exists at the start of the shift operation throughout said operation. This has the advantage that erroneous operation of the member, for example, the gas pedal, which furnishes the input signal controlling the energy supply does not cause errors which are transmitted to the pressure regulating stage. The sample-and-hold unit is also useful when the energy supply is regulated by a regulating stage rather than the gas pedal during the shift operation as disclosed in the copending application assigned to the same assignee entitled "Apparatus for Synchronizing the Driving and Driven Members During Gear Shift Operations", Ser. No. 932,171, filed Aug. 9, 1978, and claiming the priority of German Patent Application P 27 42 033.3 of Sept. 19, 1977. Further, the use of a sample-and-hold stage 14 causes a constant signal to be applied to the relevant input of unit 17 thereby obviating the need for hysteresis when sample-and-hold unit 14 is used. The position of the output of energy supply 12 at the start of the shift operation determines the main pressure in the gearing throughout the shift operation. This main pressure is maintained until the shift process is completed. At this time sample-and-hold unit 14 receives a "0" output from terminal 161 and is thereby released.

Figure 2:
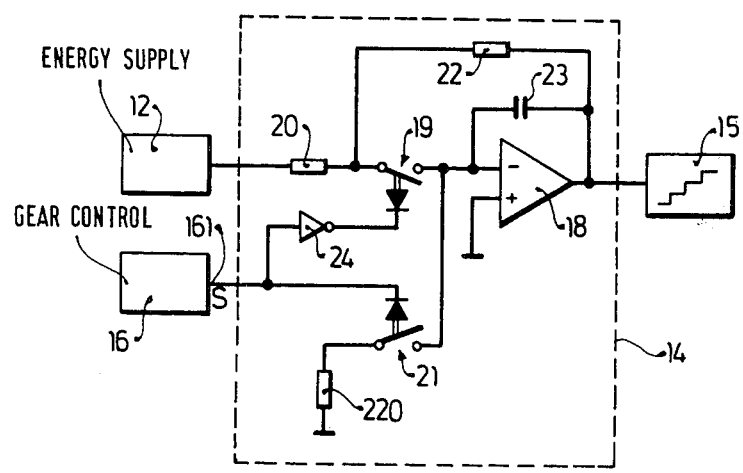
FIG. 2 is a circuit diagram of a sample-and-hold unit shown in block diagram form in FIG. 1.

FIG. 2 is a circuit diagram of sample-and-hold unit 14. An operational amplifier 18 has an inverting input connected through a switch 19 and a resistor 20 to the output of energy supply 12. It is also connected through a second switch 21 and a resistor 220 to reference potential as, for example, chassis. The direct input of operational amplifier 18 is connected to the same reference potential. The output of operational amplifier 18 is the output of sample-and-hold unit 14. It is connected to the common point of switch 19 and resistor 20 through a resistor 22 and to the inverting input through a capacitor 23. Shift command output 161 of gear control unit 16 is connected through an invertor 24 to the control input of switch 19 and directly to the control input of switch 21.

OPERATION

Under normal operating conditions, the value at the output of energy supply 12 is transmitted through operational amplifier 18 to the input of stage 15. When a "1" signal appears at terminal 161 the then-present value at the output of unit 12 is to be stored and supplied to the input of unit 15 until the shift process is completed. Specifically, when a "0" signal is present at terminal 161, switch 19 is closed and switch 21 is open. Operational amplifier 18 then acts as a first order proportional amplifier with a time constant appropriate to the dynamic behavior of the input signal. When the signal at terminal 161 switches to a "1" signal, switch 19 is opened and switch 21 is closed. Operational amplifier 18 now acts as an integrator, its inverting input being connected to reference potential through resistor 220. The value present at the output of operational amplifier 18 and thus at the output of sample-and-hold unit 14 when the shift operation started, that is when the "1" signal appeared at terminal 161, is thus stored until the gear shift operation is completed.

FIG. 3 shows a preferred embodiment of stage 17 of FIG. 1. The direct input of the comparator 25 is connected through a resistor 26 to the output of stage 12. The inverting input of comparator 25 is connected through a resistor 27 to a terminal 28. The output of comparator 25 is connected through a resistor 29 to terminal 30. It is also directly connected to the first input of an AND gate 31 and, through an inverter 32, to the first input of an AND gate 33. Terminal 162 of gear control unit 16 is directly connected to the second input of AND gate 33 and through an inverter 34 to the second input of AND gate 31. The outputs of AND gates 31 and 33 are connected to respective inputs of a NOR gate 35 whose output constitutes the output of stage 17.

OPERATION

It is a function of stage 17 to furnish an output signal which differentiates between the operating conditions described in paragraphs a and d above and those described in paragraphs b and c. Specifically, stage 17 operates to transmit the signal (either a "1" signal or a "0" signal) at terminal 162 unchanged to its output if the engine is operating under load and inverted under no load conditions. Whether the engine is operating under load or not is determined by the output of comparator 25. Comparator 25 compares the signal at the output of energy supply 12 to a threshold value which is supplied as an electrical voltage at terminal 28. When the output signal from stage 12 is very high relative to the signal applied at terminal 28, the output of comparator 25 is at the potential applied at terminal 30. If the signal at the output of stage 12 decreases below that applied at terminal 28, a "0" voltage appears at the output of comparator 25. The circuit including AND gates 31, 33, inverters 32, 34 and NOR gate 35 carries out an exclusive NOR function; that is, its output is a "1" signal when both inputs are the same and a "0" signal when the two inputs are different. The signal at terminal 162 is a "1" signal when an upshift is to be carried out and "0" signal when a downshift is to be carried out. Thus if an upshift is to take place under load (the signal at terminal 162 is "1" signal, the output of comparator 25 is a "1" signal), the output of AND gate 31 will be a "0" signal, the output of AND gate 33 will be a "0" signal and the output of NOR gate 35 will be a "1" signal. For the various different operating conditions the following truth table applies:

| RH | Operating Condition | Output NOR (35) |
| --- | --- | --- |
| 0 | Under Load | 0 |
| 1 | Under Load | 1 |
| 0 | Coasting | 1 |
| 1 | Coasting | 0 |

As can be seen from the truth table, the "0" signal appears at the output of stage 17 for upshifts when coasting and downshifts under load, while the "1" signal is present for upshift under load and downshift when coasting.

FIG. 4 is a circuit diagram of a preferred embodiment of stage 15 of FIG. 1. Sample-and-hold unit 14 is connected to pressure regulator 13 through an operational amplifier 36. Negative feedback is provided for operational amplifier 36 by a resistor 39 connected from its output to its inverting input. Further, a resistor 40 is connected in parallel with resistor 39 when a switch 42 is closed, while a resistor 41 is connected in parallel with switch 39 when a switch 43 is closed. The direct input of operational amplifier 36 is connected through a resistor 38 to the above mentioned reference potential. Its inverting input is connected through a resistor 37 to the output of sample-and-hold unit 14. The control input of switch 42 is connected to the output of an AND gate 44. One input of AND gate 44 is directly connected to output terminal 161 of gear control unit 16. The second input of AND gate 44 is connected to the output of stage 17. The control input of switch 43 is connected to the output of a NOR gate 45. Output terminal 161 of gear control stage 16 is connected through an inverter 46 to one input of NOR gate 45. The second input of NOR gate 45 is directly connected to the output of stage 17.

OPERATION

It is a function of stage 15 to transmit the signals supplied from energy supply 12 to pressure regulator 13, multiplied by the factor associated with specific ones of the above described operating conditions. If the signal at terminal 161 is a "0" signal, one input of AND gate 44 receives a "1" signal and one input of NOR gate 45 receives a "1" signal. The outputs of gates 44 and 45 are both "0" and switches 42 and 43 are open. The control signal applied to stage 13 depends only on the ratio between the resistances 39 and 37. These can be so dimensioned that the main pressure in the gearing is 1.5 times the amount required for transmitting the then-present torque. If, however, terminal 161 carries a "1" signal, a "0" output signal of stage 14 causes switch 43 to close, while a "1" signal at the output of stage 17 would cause switch 42 to close. As discussed in detail above, a "0" signal at the output of stage 17 signifies a shift up when coasting or a downshift under load. Closing of switch 43 causes resistor 41 to be connected in parallel with feedback resistor 39. This allows the pressure in gearing 11 to be reduced to a suitable value for these operating conditions. as, for example, 30%. A "1" output signal of stage 17 signifies shift up under load or downshift when coasting. In this case, switch 42 is closed by the output signal of AND gate 44 and resistor 40 is connected in parallel with feedback resistor 39.

This causes a reduction of the main pressure in the gearing to the value, for example 100%, suitable for the then-present operating conditions. When the "1" signal at terminal 161 changes back to a "0" signal, switch 42 and 43 are opened and the main pressure in gearing 11 is readjusted by pressure regulator 13 to be 150% of the required pressure.

Various changes and modifications may be made within the scope of the inventive concept.

We claim:

1. In a drive system operative under load and no load conditions, said drive system having an engine (10), gearing (11) operative in a plurality of gear ratios, transmitting means (11) for transmitting operating force from said engine to said gearing, said transmitting means having a controllable transmit characteristic adapted to vary the maximum force transmittable therethrough, regulator means (13) connected to said transmitting means for controlling said controllable transmit characteristic in accordance with a regulator signal applied thereto, and energy supply means for furnishing metered energy to said engine and for furnishing an energy control signal indicative of the amount of so-furnished energy:
   apparatus for furnishing said regulator signal to said regulator means, comprising multiplier means (36) connected to said energy supply means and said regulator means for multiplying said energy control signal by a selected one of a plurality of predetermined factors, the so-multiplied energy control signal constituting said regulator signal;
   and selector means (17, 39–46) connected to said multiplier means for selecting said selected one of said predetermined factors in accordance with the direction of gear shift and the absence or presence of load on said engine.

2. A system as set forth in claim 1, wherein said selected one of a plurality of predetermined factors is a factor of approximately 1.5 in the absence of a gear shift, of approximately 1.0 during upshift under load and downshift under no load, and a factor of 0.3 for downshift under load and upshift under no load.

3. A system as set forth in claim 2, wherein said transmitting means is a hydraulic pressure medium;
   wherein said controllable transmit characteristic is the pressure of said medium;
   and wherein said regulator means comprises pressure regulator means.

4. Method for controlling the maximum operating force transmission capability during upshifts and downshifts in gearing adapted to operate in a selected one of a plurality of gear ratios in a drive system having an engine and transmitting means coupled between said engine and said gearing for transmitting operating force from said engine to said gearing, said transmitting means having a controllable maximum operating force transmission capability, comprising the steps of
   changing said maximum operating force transmission capability by a selected one of a plurality of predetermined factors during upshift and downshift operations;
   selecting said one of said plurality of predetermined factors in dependence upon the direction of said gearshift and the absence or presence of said load; and
   wherein said selected factor is a first factor for downshifts in said absence of said load and a second factor, different from said first factor, for downshifts in said presence of said load.

5. A method as set forth in claim 4, wherein a required operating force transmission capability constitutes the maximum operating force transmission capability required to transmit the then-present torque;
   wherein said selected one of said plurality of predetermined factors is a fctor of 1.5 of said required operating force transmission capability in the absence of gear shift, a factor of 1.0 during upshift under load and downshift under no load, and a factor of 0.3 during downshifts under load and upshifts under no load.

6. A method as set forth in claim 5, wherein said transmitting means comprises a hydraulic pressure medium;
   and wherein said controllable maximum operating force transmission capability is the main pressure of said hydraulic pressure medium.

7. Method for controlling the operating force of gear elements in gearing operative in a plurality of gear ratios, driven by an engine, in a system wherein an energy control signal indicative of the amount of energy furnished to said engine is generated, said method comprising the steps of
   sampling said energy control signal at the start of an upshift of said gearing;
   storing the so-sampled value of said energy control signal during said upshift operation thereby creating a stored value signal;
   modifying said stored value signal by a predetermined factor, thereby furnishing a modified stored value signal;
   and applying an operating force corresponding to said modified stored value signal to said gear elements.

8. In a drive system operative under load and no load conditions, said drive system having an engine (10), gearing (11) operative in a plurality of gear ratios, transmitting means (11) for transmitting operating force from said engine to said gearing, said transmitting means having a controllable transmit characteristic adapted to vary the maximum force transmittable therethrough, regulator means (13) connected to said transmitting means for controlling said controllable transmit characteristic in accordance with a regulator signal applied thereto, and energy supply means for furnishing metered energy to said engine and for furnishing an energy control signal indicative of the amount of so-furnished energy;
   apparatus for furnishing said regulator signal to said regulator means comprising
   sample-and-hold circuit means connected to said energy supply means for sampling said energy control signal at the start of an upshift operation and holding the so-sampled value, thereby creating a stored energy control signal;
   multiplier means (36) connected to said sample-and-hold circuit means and said regulator means for multiplying said stored energy control signal by a selected one of a plurality of predetermined factors, the so-multiplied stored energy control signal constituting said regulator signal during said upshift; and
   selector means connected to said multiplier means for selecting said factor in dependence upon at least one predetermined operating condition of said system.

9. A system as set forth in claim 8, wherein said sample-and-hold means comprises an operational amplifier (18) having an inverting input, a direct input and an output, a capacitor (23) connected from said output to said inverting input, first switch means (19) having a control input connected to said gear control means for connecting said inverting input of said oprational amplifier to said energy supply means in the absence of said first gear control signal, second switch means (21) having a control input connected to said gear regulator means for connecting said inverting input to a reference potential in the presence of said first gear control signal, and means for furnishing said reference potential.

10. A system as set forth in claim 8, wherein said drive system further comprises gear control means (16) connected to said selector means for furnishing a first gear control signal indicative of the absence or presence of a gear shift operation by, respectively, the absence and presence thereof and a second gear control signal indicative of the direction of shift;

and wherein said selector means comprises means for selecting a selected one of said plurality of predetermined factors under control of said first and second gear control signals.

11. A system as set forth in claim 10, wherein said selector means comprises first selector means (17) connected to said energy supply means and said gear control means for furnishing a first selector signal signifying upshift under no load or downshift under load and a second selector signal indicative of upshift under load and downshift under no load, and second selector means connected to said first selector means and said gear control means for selecting said predetermined one of a plurality of predetermined factors under control of said first and second selector signal and said first gear control signal.

12. A system as set forth in claim 11, wherein said first selector means has a first input connected to said energy supply means, a second input connected to said gear control means for receiving said second gear control signal, threshold circuit means (25) connected to said first input for furnishing a load signal when said energy control signal exceeds a predetermined threshold value and a no load signal when said energy control signal is less than said pedetermined threshold value, and first selector logic means (31, 33, 34, 35) connected to said second input of said first selector means and said threshold circuit means for furnishing said first selector signal in dependence upon said second gear control signal and said load or no load signal.

13. A system as set forth in claim 12, wherein said second gear control signal is a "1" signal for upshift operations;

wherein said threshold circuit furnishes a "1" signal when said energy control signal exceeds said threshold value and a "0" signal when said energy control signal is less than said threshold value;

and wherein said first selector logic means comprises a first AND gate (31) having a first input connected to said threshold circuit means, a second input and an output, a second AND gate (33) having a first input connected to said gear control means, a second input and an output, a first and second inverter for, respectively, connecting said second input of said first AND gate to said gear control means and for connecting said second input of said second AND gate to said threshold circuit means, respectively, and a NOR gate (35) having a first and second input respectively connected to the outputs of said first and second AND gate and a NOR gate output connected to said second selector means.

14. A system as set forth in claim 13, wherein said multiplier means comprises operational amplifier means (36) having an inverting input, a direct input, an output, first feedback resistor means (39) connected from said output to said inverting input, and input resistor means (37) connected to said sample-and-hold circuit means;

and wherein said second selector means comprises first and second switch selector means (42, 43) operative under control of said first gear control signal and said first selector signal for connecting additional resistor means in parallel with said first feedback resistor means under control of said first gear control signal and said first selector signal.

15. A system as set forth in claim 14, wherein said first and second switch selector means have, respectively, a first and second switch selector control input;

further comprising a NOR gate (45) having a NOR gate output connected to said first switch control input, a first input connected to said first selector means and a second input, inverter means (46) connected between said gear control means and said second input of said NOR gate, and an AND gate (44) having an AND gate output connected to said switch control input of said second switch selector means, a first input connected to said first selector means and a second input connected to said gear control means.

* * * * *